United States Patent [19]

Perla

[11] 4,416,027
[45] Nov. 22, 1983

[54] DIVING SUIT SEAM CONSTRUCTION

[76] Inventor: Henry L. Perla, 1223 Harbour Island Rd., Orlando, Fla. 32809

[21] Appl. No.: 462,530

[22] Filed: Jan. 31, 1983

[51] Int. Cl.³ .............................................. A41D 27/22
[52] U.S. Cl. ......................................... 2/275; 2/21 R;
112/441; 112/262.1; 156/304.3; 156/159;
156/93; 156/257; 156/258; 156/304.1;
156/304.5; 428/57; 428/61; 428/104
[58] Field of Search ................. 156/93, 157, 159, 257,
156/258, 304.1, 304.3, 304.5; 428/104, 61, 57;
2/275, 2.1 R; 112/440, 441, 262.1

[56] References Cited

U.S. PATENT DOCUMENTS

| | | |
|---|---|---|
| 618,738 | 1/1899 | Sargeant ............................ 156/304.3 |
| 2,570,019 | 10/1951 | Wolk . |
| 3,246,337 | 4/1966 | Copeland . |
| 3,246,621 | 4/1966 | Copeland . |
| 3,255,459 | 6/1966 | Way . |
| 3,305,423 | 2/1967 | Masson . |
| 3,329,966 | 7/1967 | Slavick . |
| 3,337,876 | 8/1967 | Armstrong . |
| 3,404,406 | 10/1968 | Balliet . |
| 3,444,570 | 5/1969 | Smith . |
| 3,513,825 | 5/1970 | Chun . |
| 3,660,851 | 5/1972 | Marroni, Jr. . |
| 3,686,064 | 8/1972 | Bonnet et al. . |
| 3,725,173 | 4/1973 | Johnson et al. . |
| 3,731,319 | 5/1973 | O'Neill . |
| 3,744,052 | 7/1973 | Rector . |
| 3,763,498 | 10/1973 | Rector . |
| 3,771,169 | 11/1973 | Edmund . |
| 3,818,507 | 6/1974 | Albrecht . |
| 3,832,735 | 9/1974 | Elkins et al. . |
| 4,055,174 | 10/1977 | LeVasseur . |
| 4,067,064 | 1/1978 | Cerniway et al. . |
| 4,276,341 | 6/1981 | Tanaka . |
| 4,376,668 | 3/1983 | Ginter, Jr. et al. ................. 156/159 |

FOREIGN PATENT DOCUMENTS

| | | |
|---|---|---|
| 88171 | 6/1960 | Denmark . |
| 979205 | 4/1951 | France . |
| 1182262 | 6/1959 | France . |
| 1252289 | 12/1960 | France . |
| 1306301 | 9/1962 | France . |
| 1306990 | 9/1962 | France . |
| 2361269 | of 1976 | France . |
| 842768 | 7/1960 | United Kingdom . |
| 891998 | 3/1962 | United Kingdom . |

Primary Examiner—Edward C. Kimlin
Assistant Examiner—Timothy W. Heitbrink
Attorney, Agent, or Firm—Edward M. Livingston

[57] ABSTRACT

An improved seam construction for diving suits and method of performing same which consists of a seam formed by cutting slits into the edges of two abutting pieces of elastomeric material, gluing and stitching the outer layers of the edge of each piece, inserting and gluing a filler strip of material into the interior of the cavity formed by the slit and gluing the inner layers of the material over said filler strip. Diving suits formed using such seam construction are stronger, more comfortable, more durable, more aesthetic and leakproof.

2 Claims, 4 Drawing Figures

DIVING SUIT SEAM CONSTRUCTION

BACKGROUND OF THE INVENTION

This invention relates to the construction of diving suits, particularly to improved seam construction to decrease leakage and at the same time increase the strength of diving suits.

The current method of seam construction in diving suits is represented by the prior art, the closest of which is U.S. Pat. No. 3,246,621 and Fr. Pat. Nos. 1.306.301 and 1.306.990. U.S. Pat. No. 3,246,621 illustrates a method of seam construction which is formed by butting two edges of elastomeric material together using lock stitching to secure them together. In the aforementioned France patents, the butting edges are glued together and a strip of rubber is glued along the length of the edges to form the seam of the diving suit.

The current state of the art in diving suit seam construction is to combine the two methods above. Such seam construction consists of gluing abutting edges of elastomeric materials together, stitching the edges and gluing a strip of rubber to the outside and/or to the interior seam in an attempt to reduce leakage.

Unfortunately, there are many problems which arise with the current state of the art in diving suit seam construction. During wear, such seams can be easily separated or broken resulting in leaks through the suit. Further, the rubber strip glued to the inside of the seams also rubs against the body which may loosen the seam and result in leaks. Moreover, the movement of the rubber strip against the body, irritates the skin. Also, the current method of seam construction in diving suits often results in accidental stitch penetration. Accidental penetration occurs during the stitching process when the needle punctures the interior of the seam, which may allow water to follow the thread lines through the seams and into the suit.

Another problem with current diving suit construction is that only one type of glue may be used in gluing seams, that is, a crystalline glue. Although crystalline glue results in a strong but rigid bond a drawback of its use is that very cold water causes the crystalline glue to develop minute cracks which may cause leakage and reduce the strength of the suit.

The instant invention solves all of the above mentioned problems associated with diving suit seam construction by providing an improved method of seam construction, which reduces leakage and increases the strength of the seams, thereby considerably increasing the life of the diving suits. By the insertion of a filler strip made of elastomeric material, such as rubber, in a slit in the interior of the suit material along each seam, leakage is substantially reduced because the water has to permeate through the glue on the outside of the seam, around the rubber filler strip and through the inner seam, thereby traveling approximately twice as far as with current seam construction before leakage can occur. Also, because the rubber filler strip is inserted within the material, the inside edges of the seam are smooth, thereby eliminating skin irritation.

The instant invention goes further in reducing leakage by eliminating accidental stitch penetration through the suit material because only the exterior of the suit is exposed to stitching. Furthermore, the instant invention provides for considerably stronger seams in diving suits since there is more adhesive area. Another feature of this invention that increases the strength of the seams is that it allows the optional use of two types of glue on the seams: a crystalline glue, which is the only glue which can be used in current seam construction and a non-crystalline glue to make the seam more pliable than current seams.

SUMMARY OF THE INVENTION

In accordance with the foregoing background discussion, the primary object of this invention is to provide improved seam construction for diving suits.

A further object of this invention is to provide a seam and method of seam construction that reduces or eliminate leakage altogether in diving suits or other suits requiring leak-proof conditions.

A further object of this invention is to provide a more comfortable, and at the same time, a more aesthetic looking diving suit.

Another object of this invention is to increase the durability and product life of the diving suits.

The instant invention accomplishes these and other objects by utilizing a method of improved seam construction which results in a diving suit with more and ahesive area—approximately twice the adhesive area obtained by prior methods of construction. This increased adhesive area not only prevents leakage but increases the strength of such seams. Further, this method of constructing the seams eliminates the possibility of accidental stitch penetration and the leakage associated therewith. Also, the insertion of the rubber strip in the diving suit material itself prevents irritation of the skin caused by exposure of the rubber strip, and results in a more comfortable and better looking diving unit.

DESCRIPTION OF THE PREFERRED EMBODIMENTS

Figure 1:
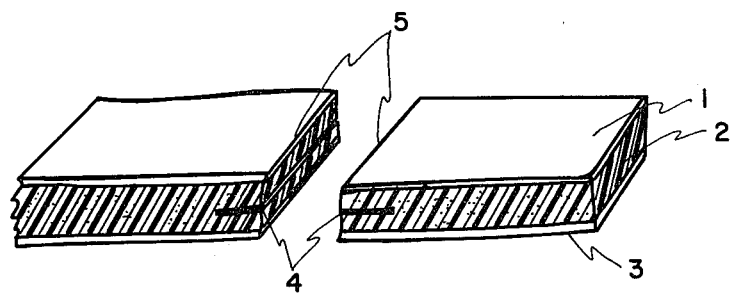
FIG. 1 is a fragmentary perspective view of two sections of diving suit material.
Figure 2:
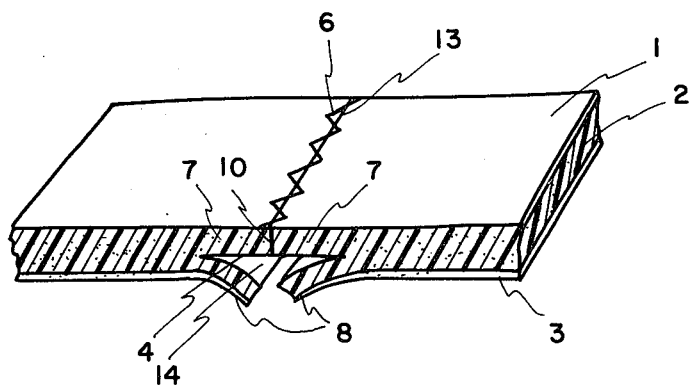
FIG. 2 is also a fragmentary perspective view of the diving suit showing the outer layer of material joined together.

Referring now in detail to the drawings, FIG. 1 illustrates two fragmentary pieces of material used to construct diving suits. Although different materials may be used to construct diving suits the most often used material consists of a neoprene foam rubber sheet 2 having approximately $\frac{1}{8}''$ thickness, with the interior and exterior surfaces which may be covered with lycra material 3 or nylon material 1 as illustrated in FIG. 1.

Figure 3:
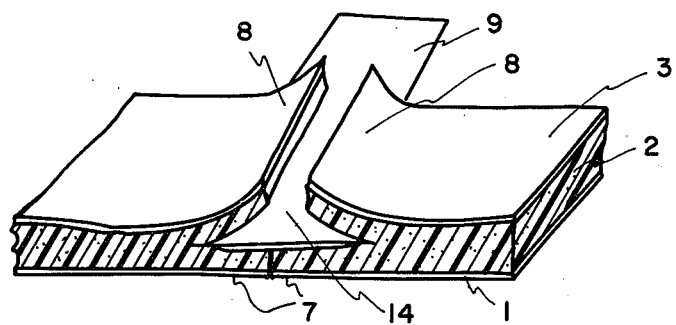
FIG. 3 is a fragmentary perspective view showing the insertion of the rubber filler strip.
Figure 4:
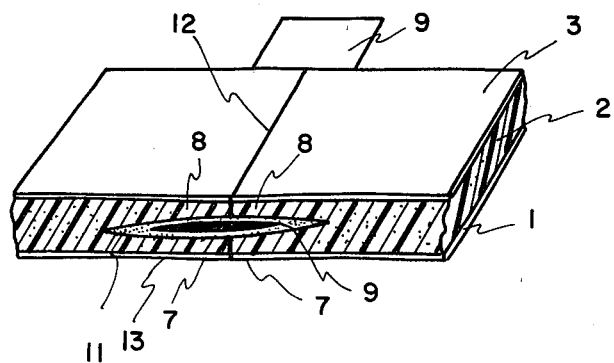
FIG. 4 is a perspective view showing the finished diving suit seam.

The first step in fashioning the seam provided by the instant invention is to slit the abutting edges 5 of each piece of material to form slits 4 approximately $\frac{1}{2}''$ in depth and extending along the entire length of the seam as shown in FIG. 1. The second step is to glue the outer edges 7 to form the outer seam 13. The third step in this method of seam construction is to stitch the outer seam 13 while the inner seam layers 8 remain folded inward to prevent stitch penetration through the entire layer of the material. The resulting stitching 6 thus penetrates only the outer position of the outer layer 7 of the material. The next and fourth step in the process is to turn the material over so that the outside nylon layer 1, if there is one, is on the bottom and to insert a filler strip of elastomeric material 9 (such as rubber) inside the seam opening 14 as shown in FIG. 3. If desired, the rubber filler strip 9 may be covered with a non-crystalline glue 11 to provide for more pliability. Finally, the inner layers 8 are joined together with glue to form the inner seam 12. If desired, additional strips of rubber material can be glued along the inner seam 12 to increase seam strength even more.

In addition to the numerous advantages over the prior art in terms of leak prevention, comfort and strength, this method also allows a dual glue approach, an option not possible with prior methods of diving suit construction. The dual glue approach involves the use of a crystalline glue to glue both the inner 12 and outer 13 seams of the diving suit and a non-crystalline glue 11 in the interior where the rubber filler strip 9 is inserted. The crystalline glue forms a very strong, but rigid bond on the seams. However, its major drawback is that it develops minute cracks in very cold water which may cause leakage and reduce the strength of the seams. Thus, by having the option of using a non-crystalline glue, a type of glue which remains soft and pliable even after drying, in the interior of the seam, can reduce leakage even in very cold water situations. Thus, the combination of using a crystalline glue for strength on the abutting edges of the seam and a non-crystalline glue on the interior strip to insure against leaks gives the instant invention superiority over current methods of diving suit construction in terms of both strength and the ability to repel leaks.

In summary, this invention provides improved diving suit seam construction and a method of seam construction which is superior to any seam construction in the prior art in terms of strength, durability, impermeability, comfortability and aesthetics.

Thus, while the preferred embodiments of the invention and the various modes of utilization have been described in detail hereinabove, it must be understood that various modifications may be made from the specific details described herein without departing from the spirit and scope of the invention.

Having thus described my invention, I claim the following:

1. An improved diving suit seam construction comprising: two pieces of elastomeric material, such as neoprene foam rubber, in sheet form, the surfaces of which may or may not be covered with nylon or lycra material depending on the diving suit style, said pieces having abutting edges and each containing slits cut into the abutting edges with one of the surfaces of material joined together by glue and stitching; and a filler strip of elastomeric material inserted and glued inside the slits over which the outer pieces of material are joined by glue.

2. A method of diving suit seam construction comprising:

providing two pieces of elastomeric material having interior and exterior surfaces and abutting edges;

cutting slits into the edges of the abutting pieces of elastomeric material;

gluing the abutting edges of the two pieces along the exterior surfaces while the abutting edges of the interior surfaces are folded outward;

stitching the exterior surface edges of the pieces;

inserting a strip of elastomeric material inside the cavity formed by the seam of the abutting edges of the exterior surfaces and the outwardly folded interior surfaces; and bringing the outwardly folded interior surfaces into abutting relationship and gluing their edges together to form the finished seam.

* * * * *